US009760693B2

(12) United States Patent
Gurel et al.

(10) Patent No.: US 9,760,693 B2
(45) Date of Patent: Sep. 12, 2017

(54) METHOD AND APPARATUS FOR A CONTENT PROTECTING AND PACKAGING SYSTEM FOR PROTECTING A CONTENT PACKAGE

(75) Inventors: Mustafa Iihan Gurel, Espoo (FI); Janne Sakari Mantyla, Espoo (FI); Sami Petteri Lehtisaari, Nokia (FI); Tommi Sakari Von Hertzen, Prikkala (FI); Juhani Makela, Helsinki (FI); Markku Kylanpaa, Helsinki (FI); Markku Savela, Espoo (FI); Kimmo Surakka, Espoo (FI); Bartlomiej Piotr Jozwiak, Lodz (PL); Elena Gillet, Kerava (FI)

(73) Assignee: Nokia Technologies Oy, Espoo (FI)

( * ) Notice: Subject to any disclaimer, the term of this patent is extended or adjusted under 35 U.S.C. 154(b) by 478 days.

(21) Appl. No.: 12/981,702

(22) Filed: Dec. 30, 2010

(65) Prior Publication Data
US 2012/0008777 A1   Jan. 12, 2012

Related U.S. Application Data

(60) Provisional application No. 61/291,630, filed on Dec. 31, 2009.

(51) Int. Cl.
*H04L 29/06*      (2006.01)
*G06F 21/10*      (2013.01)
(Continued)

(52) U.S. Cl.
CPC ............ *G06F 21/10* (2013.01); *H04L 9/0838* (2013.01); *H04L 63/0435* (2013.01);
(Continued)

(58) Field of Classification Search
CPC . G06F 21/10; G06F 21/6209; H04L 63/0428; H04L 2209/60; H04L 9/3247;
(Continued)

(56) References Cited

U.S. PATENT DOCUMENTS 5,999,622 A   12/1999  Yasukawa et al.
7,191,332 B1   3/2007  Pankajakshan et al.
(Continued)

FOREIGN PATENT DOCUMENTS

| WO | 2009124715 A1 | 10/2009 |
| WO | WO2009/124715 | * 10/2009 |
| WO | WO2009124715 | * 10/2009 |

OTHER PUBLICATIONS

International Search Report and Written Opinion, received in corresponding Patent Cooperation Treaty Application No. PCT/IB2010/056001, dated Apr. 18, 2011. 14 pages.
(Continued)

*Primary Examiner* — Jung Kim
*Assistant Examiner* — Carlos M De Jesus Lassala
(74) *Attorney, Agent, or Firm* — Alston & Bird LLP

(57) ABSTRACT

An apparatus for providing an improved content protecting and packaging system for protecting content may include an extractor for extracting a content package into a plurality of content segments including a first portion and a second portion. An enveloper may envelop each of the content segments in the first portion separately to thereby create one or more protected content segments. Further, a packager may package the protected content segments with the second portion of the content segments into a protected content package, which may then be uploaded to a distributor for distribution to user terminals. A corresponding method and computer program product are also provided.

20 Claims, 4 Drawing Sheets

(51) Int. Cl.
*H04L 9/08* (2006.01)
*H04L 9/32* (2006.01)

(52) U.S. Cl.
CPC ........ *H04L 63/0471* (2013.01); *H04L 9/0825* (2013.01); *H04L 9/3247* (2013.01); *H04L 2209/60* (2013.01); *H04L 2463/101* (2013.01)

(58) Field of Classification Search
CPC ......... H04L 2209/603; H04L 2463/101; H04L 2209/605; H04L 63/0435; H04L 63/0471; H04L 9/0825
USPC .......................................................... 380/255
See application file for complete search history.

(56) References Cited

U.S. PATENT DOCUMENTS

| | | | |
|---|---|---|---|
| 8,495,388 B2* | 7/2013 | Zunke | 713/190 |
| 2002/0027992 A1* | 3/2002 | Matsuyama et al. | 380/231 |
| 2002/0188570 A1* | 12/2002 | Holliman et al. | 705/57 |
| 2004/0049694 A1* | 3/2004 | Candelore | H04N 5/783 726/14 |
| 2004/0143760 A1 | 7/2004 | Alkove et al. | |
| 2005/0114689 A1* | 5/2005 | Strom et al. | 713/193 |
| 2007/0083467 A1 | 4/2007 | Lindahl et al. | |
| 2007/0143856 A1 | 6/2007 | Aerrabotu et al. | |
| 2007/0208668 A1 | 9/2007 | Candelore | |
| 2007/0242827 A1* | 10/2007 | Prafullchandra et al. | 380/241 |
| 2008/0256368 A1* | 10/2008 | Ross | G06F 21/10 713/193 |
| 2009/0157552 A1* | 6/2009 | Schnell et al. | 705/59 |
| 2009/0235361 A1* | 9/2009 | Sloo et al. | 726/26 |
| 2009/0310776 A1 | 12/2009 | Kanemitsu | |

OTHER PUBLICATIONS

Supplementary European Search Report for Application No. EP 10 84 0686 dated May 30, 2017, 8 pages.

\* cited by examiner

METHOD AND APPARATUS FOR A CONTENT PROTECTING AND PACKAGING SYSTEM FOR PROTECTING A CONTENT PACKAGE

RELATED APPLICATION

This application claims priority to U.S. Application No. 61/291,630 filed Dec. 31, 2009, which is incorporated herein by reference in its entirety.

TECHNICAL FIELD

Embodiments of the present invention relate generally to content sharing technology and, more particularly, relate to an apparatus, method and a computer program product for providing a content protecting and packaging system for protecting a content package.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of content transfer.

Current and future networking technologies continue to facilitate ease of content transfer and convenience to users by expanding the capabilities of mobile electronic devices. Networks and services have been developed to enable users to download content, such as applications for mobile electronic devices. To complement mechanisms for distribution and sharing of content, mechanisms have also been developed to provide for distribution of commercial content. In order to prevent unauthorized use or copying of commercial content, there has been an increased need for content protection sometimes in the form of Digital Rights Management (DRM). In particular, the distribution of commercial applications to devices presents a challenging situation for developers and vendors. In this regard, the application must be easily distributable while remaining protected both during the distribution and use of its content on the device. Open source platforms may add additional complexities to the operation of protecting content, as may use of packages to distribute the content. Without adequate protection developers may tend to avoid creation of applications due to the potential that their applications may be used and distributed without receipt of payment.\

Accordingly it may be desirable to provide an improved content protecting and packaging system for protecting content.

BRIEF SUMMARY OF THE INVENTION

A method, apparatus and computer program product are therefore provided that may provide an improved content protecting and packaging system for protecting content. Thus, for example, it may be possible to enable distribution of protected packaged content through a distributor to users, while maintaining a secure product.

In an exemplary embodiment, a method of providing an improved content protecting and packaging system for protecting content is provided. The method may include receiving a content package, extracting the content package into a plurality of content segments comprising a first portion and a second portion, enveloping each of the content segments in the first portion separately to thereby create one or more protected content segments, packaging the protected content segments with the second portion of the content segments into a protected content package, and providing for transmission of the protected content package.

In some exemplary embodiments enveloping of the first portion of the content segments is performed by separately encrypting each of the content segments with a cipher. The method may further include sharing a key corresponding to the cipher. The key may correspond to all of the protected content segments. In some embodiments of the method, the key is associated with one license. The protected content package may be configured for installation on a user terminal, wherein each use of the protected content segments by the user terminal requires the license. The method may also comprise receiving a protection indicator indicating which of the content segments are in the first portion, and thereby designated for enveloping. Additionally, the method may include receiving a permission indicator indicating a level of permission required to access the protected content segments.

In an additional exemplary embodiment a computer program product comprises at least one computer-readable storage medium having computer-executable program code portions stored therein, the computer-executable program code portions comprising program code instructions for receiving a content package, program code instructions for extracting the content package into a plurality of content segments comprising a first portion and a second portion, program code instructions for enveloping each of the content segments in the first portion separately to thereby create one or more protected content segments, program code instructions for packaging the protected content segments with the second portion of the content segments into a protected content package, and program code instructions for providing for transmission of the protected content package.

In some embodiments the program instructions for enveloping the first portion of the content segments include instructions for separately encrypting each of the content segments with a cipher and sharing a key corresponding to the cipher. The key may correspond to all of the protected content segments. In some embodiments of the computer program product, the key is associated with one license. The protected content package may be configured for installation on a user terminal, wherein each use of the protected content segments by the user terminal requires the license. Additionally, the computer program code instructions may include program code instructions for receiving a protection indicator indicating which of the content segments are in the first portion, and thereby designated for enveloping. Further, the computer program code instructions may include program code instructions for receiving a permission indicator indicating a level of permission required to access the protected content segments.

In a further exemplary embodiment an apparatus comprising at least one processor and at least one memory including computer program code is provided, wherein the at least one memory and the computer program code are configured to, with the processor, cause the apparatus to at least perform receiving a content package, extracting the content package into a plurality of content segments comprising a first portion and a second portion, enveloping each of the content segments in the first portion separately to thereby create one or more protected content segments, packaging the protected content segments with the second portion of the content segments into a protected content package, and providing for transmission of the protected content package.

In some embodiments the program code causes the apparatus to envelop the first portion of the content segments by separately encrypting each of the content segments with a cipher and the program code may further cause the apparatus to share a key corresponding to the cipher. The key may correspond to all of the protected content segments, and the key may be associated with one license. The protected content package may be configured for installation on a user terminal, wherein each use of the protected content segments by the user terminal requires the license. The program code may additionally cause the apparatus to receive a protection indicator indicating which of the content segments are in the first portion, and thereby designated for enveloping. The program code may further cause the apparatus to receive a permission indicator indicating a level of permission required to access the protected content segments.

Accordingly, embodiments of the present invention may enable improved capabilities with respect to sharing content through use of protected content packages.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
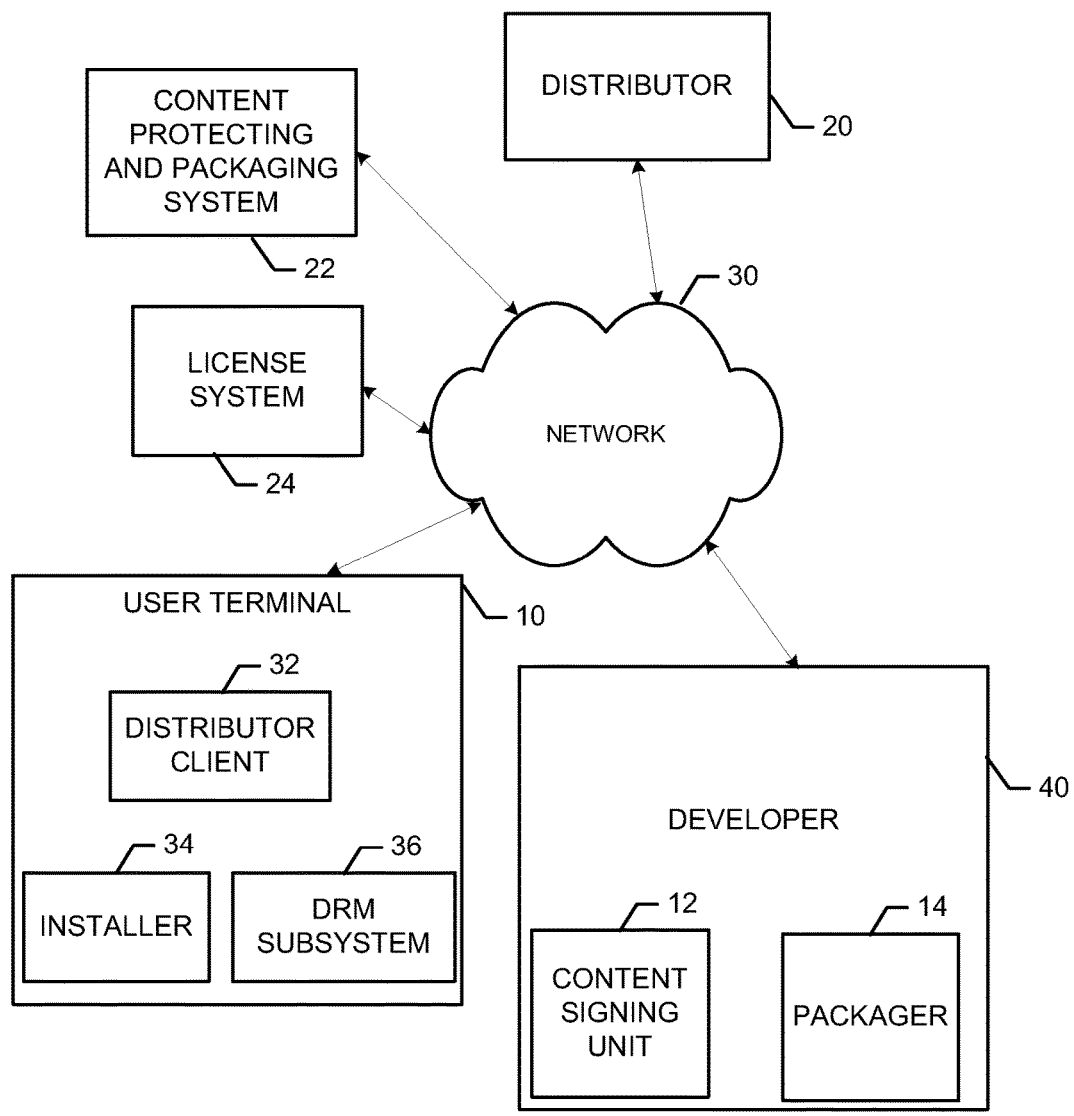
FIG. 1 illustrates a schematic block diagram of a system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As indicated above, embodiments of the present invention may be employed in methods, apparatuses and computer program products in order to provide a content protecting and packaging system with capabilities for protecting packaged content. In this regard, for example, FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention. Moreover, although MICROSOFT® PLAYREADY® is referred to as one example of a Digital Rights Management (DRM) technology, it should be understood that embodiments of the present invention are not limited to applications with MICROSOFT® PLAYREADY®, but may be used in connection with other DRM technologies.

As shown in FIG. 1, an embodiment of a system in accordance with an example embodiment of the present invention may include a developer 40. The developer 40 may be a for-profit company, a non-profit company, an individual, or a group of individuals which have one or more servers or other computing device connected to a network 30, for example, and which create content. Content, as used herein, refers to programs, applications, and other forms of software and files. Content thus refers to all types of computer program code and is not limited to use on any particular embodiment of an electronic device. Further, content may be commercial or non-commercial in nature.

The developer 40 may be capable of communication with numerous other devices including for example, a user terminal 10, either directly, or via the network 30. In an exemplary embodiment, the content created by the developer 40 may comprise a game which is executable on the user terminal 10. In some instances the developer 40 may include or otherwise communicate with a packager 14. The packager 14 may be configured to package content segments created by the developer 40. By way of example, content segments may comprise files or other components of programs and applications. Thus, the packager 14 packages the content segments into a content package which may be distributable as an integral unit. One embodiment of a content package according to an exemplary embodiment of the invention is that of a Debian package which may be configured for use with an open platform such as Maemo on an end user device such at the user terminal 10.

In some cases, the developer 40 may include, be associated with, or otherwise be functional in connection with a content protecting and packaging system 22. The content protecting and packaging system 22 may in some embodiments be configured to extract content packages, provide content protection services, and package content as described hereinafter in order to enable DRM with respect to content introduced into the content protecting and packaging system. The content protecting and packaging system 22 may be any means such as a device or circuitry embodied in hardware, software or a combination of hardware and software that is configured to perform the corresponding functions of the content protecting and packaging system 22 as described herein. As such, for example, the content protecting and packaging system 22 may, in some cases, be embodied as a server, server bank or other computing device.

In an exemplary embodiment a license system 24 may be employed in conjunction with or as part of the content protecting and packaging system 22. The license system 24 may be any means such as a device or circuitry embodied in hardware, software or a combination of hardware and software that is configured to perform the corresponding functions of the license system as described herein. In some cases, the license system 24 may be embodied in the content protecting and packaging system 22. However, in alternative embodiments, the content protecting and packaging system 24 may be embodied at another device in the system (e.g., at a distributor 20, etc.). As will be described hereinafter, the license system 24 may be configured to work in conjunction with the content protecting and packaging system 22 to provide a license to an end user device such as the user terminal 10 which enables the end user to use the content. In this regard, the license system 24 may communicate, such as through the network 30, with the content protecting and packaging system 22 so that a decryption key can be provided with the license which allows the content to be used when the content is encrypted by the content protecting and packaging system 22.

After undergoing protection and packaging in the content protecting and packaging system 22, the protected content package may be returned to the developer 40. In some cases, a content signing unit 12 may be included or otherwise usable in connection with the developer 40 to sign content with the developer's signature or some other indicia associated with the developer. The content signing unit 12 may be any means such as a device or circuitry embodied in hardware, software or a combination of hardware and software that is configured to perform the corresponding functions of the content signing unit as described herein. Although shown in connection with the developer 40 in FIG. 1, the content signing unit 12 may, for example, be located at various physical locations, co-located with the distributor 20, or at the premises of a trusted third party. Registered contact information may be associated with the signature or other indicia of the developer 40. Signing of the content may occur after it is returned from the content protecting and packaging system 22, such that the developer 40 uses the content signing unit 12 to sign the protected content package, as opposed to signing an unprotected content package.

The protected content package may be received by a distributor 20 which may be used to distribute content to the user terminal 10, or other end user devices. The distributor 20 may for example be a server, server bank or other computer or other computing device or node configured to distribute content. The distributor 20 may have any number of functions or associations with various services. As such, for example, the distributor 20 may be a platform such as a dedicated server (or server bank), or the distributor may be a backend server associated with one or more other functions or services. Thus, the distributor 20 represents a potential host for a plurality of different content. One example of a distributor 20 is an application store, or "AppStore." The distributor 20 may receive content such as content created by the developer 40 and protected and processed by the content protecting and packaging system 22. The distributor 20 may then distribute the content via the network 30, or the distributor may distribute the content directly to end users such as the user terminal 10. The distributor 20 may distribute commercial and/or non-commercial content. Accordingly, the operations performed by the distributor 20 may or may not comprise processing payment in exchange for distributing the content. In some embodiments payment may be processed by a separate device.

The user terminal 10 may be any of multiple types of fixed or mobile communication and/or computing devices such as, for example, portable digital assistants (PDAs), pagers, mobile televisions, mobile telephones, gaming devices, laptop computers, PCs, cameras, camera phones, video recorders, audio/video players, radios, global positioning system (GPS) devices, or any combination of the aforementioned, and other types of voice and text communications systems, which employ embodiments of the present invention. In order to receive and use the content, the user terminal 10 may include or be associated with a distributor client 32, an installer 34, and a DRM subsystem 36. Briefly, the distributor client 32 may be used by a user to select an application comprised of content for installation on the user terminal 10 and communicate with the distributor 20, DRM subsystem 36, and installer 34. The DRM subsystem may be used to request and receive a license from the license system 24 which enables installation of the content on the user terminal 10, which is in turn conducted by the installer 34.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), e.g., the Internet. In turn, other devices such as processing elements (e.g., personal computers, server computers or the like) may be included in or coupled to the network 30. By directly or indirectly connecting the user terminal 10 and the other devices to the network 30, the user terminal 10 and/or the other devices may be enabled to communicate with each other, for example, according to numerous communication protocols including Hypertext Transfer Protocol (HTTP) and/or the like, to thereby carry out various communication or other functions of the mobile terminal 10 and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity. Further, although the various systems and devices shown in FIG. 1 are illustrated as being in communication through the network 30, it should be understood that in some embodiments some communication may occur directly as opposed to through the network.

In an exemplary embodiment, an apparatus 50 is provided that may be employed at devices performing exemplary embodiments of the present invention. The apparatus 50 may be embodied, for example, as any device hosting, including, controlling or otherwise comprising the content protecting and packaging system 22. Thus, the apparatus 50 could be a server or other device of the content protecting and packaging system 22, the license system 24, or the distributor 20 or of the network 30 itself when the content protecting and packaging system is embodied at or included with a respective one of these entities. However, embodiments may also be embodied on a plurality of other devices such as for example where instances of the apparatus 50 may be embodied on both client side and server side devices. As such, the apparatus 50 of FIG. 2 is merely an example and may include more, or in some cases less, than the components shown in FIG. 2.

Figure 2:
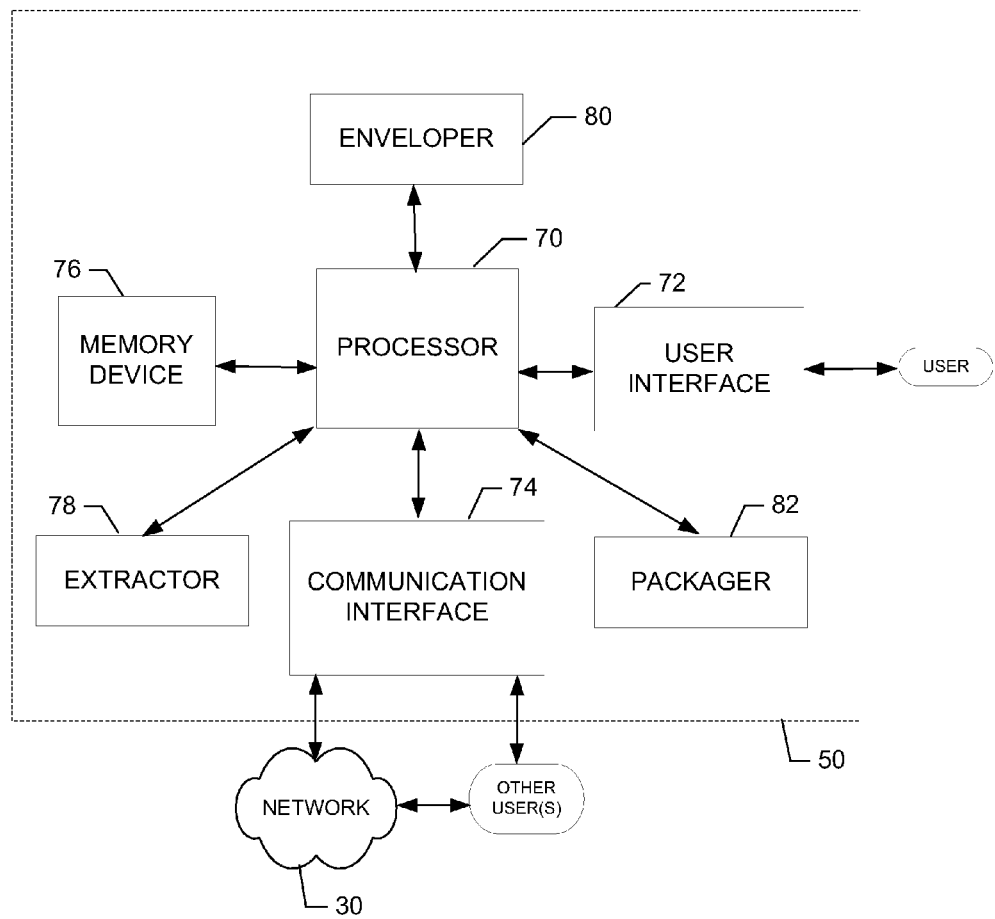
FIG. 2 illustrates a schematic block diagram of an apparatus for providing a content protecting and packaging system for protection of a content package according to an exemplary embodiment of the present invention.

Referring now to FIG. 2, an apparatus 50 for protecting and packaging content is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases or storage locations that store information and/or media content.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as Bluetooth, Infrared, UWB, WiFi, and/or the like, which are being increasingly employed in connection with providing home connectivity solutions.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control an extractor 78. The extractor 78, according to some embodiments, is any means such as a device or circuitry embodied in hardware, software or a combination of hardware and software that is configured to perform extracting of a content package into a plurality of content segments after a content package is received by the apparatus 50, such as through the communication interface 74 from the network 30. The content segments may comprise a first portion, which includes one or more content segments that are to be separately (i.e. individually) protected, and a second portion which includes one or more content segments that are not to be protected. In this regard, it may not be necessary to protect the entirety of the content. Instead, only the content segments necessary for use of the content on the end user device may be protected. For example, it may not be necessary to protect the executable files, but rather a limited number of files may be selected for protection which are necessary for use of the content. Further, the apparatus 50 may receive a protection indicator indicating which of the content segments are in the first portion, and thereby designated for enveloping. For example, the developer 40 may specify which content segments require protection. The developer 40 may need to know which content segments will be protected in order to call relevant Application Programming Interfaces (APIs) to handle the protected content when the end user is using the content. The apparatus 50 may also receive a permission indicator indicating a level of permission required to access the protected content segments. As before, this may be set by the developer 40 and transmitted to and received by the apparatus 50 through the communication interface 74, for example. Thus, varying levels of protection may be set for the protected content segments. This may be useful, for example, when the developer 40 wants different end users to have different levels of access to the features provided by the content. For example, the developer could offer "premium" and "basic" versions of an application in a single content package, with greater permission requirements associated with the premium version.

Thus, an enveloper 80 separately envelops each of the content segments comprising the first portion to thereby create one or more protected content segments. An enveloper, as described herein, refers to a device or circuitry embodied in hardware, software or a combination of hardware and software that is configured to protect content such as by encryption. By way of example, enveloping may use MICROSOFT® PLAYREADY® technology with a content key and AES-256 cipher. Thus, enveloping may occur, for example, using encryption with a cipher to thereby separately encrypt each of the content segments (e.g. each of a number of selected files). The apparatus 50 may further share a key corresponding to the cipher. Sharing of the key, as used herein, refers to one or both of receiving or transmitting of the key. For example, the license system 24 may transmit the key to the apparatus 50 along within any corresponding constraints such as a license period. The key may correspond to all of the protected content segments, such that only one key is needed to decrypt the protected content. Alternatively or additionally, the key(s) may be associated with one license, such that the protected content may be decrypted with only a single license, as opposed to multiple licenses. Associating the key(s) with one license may be conducted by the license system 24 in some embodiments.

After the enveloper 80 creates one or more protected content segments, the protected content segments are packaged by a packager 82 with the second portion of the content segments, which are unprotected, into a protected content package. Finally, the apparatus 50 transmits or provides for transmission of the protected content package, such as by using the communication interface 74 to transfer the protected content package to the network 30. As previously discussed, the protected content package may be received by the developer 40 for signing by the content signing unit 12 before it is uploaded to the distributor 20. Accordingly, the apparatus may create a protected content package which may frustrate attempts at unauthorized use of the content.

Figure 3:
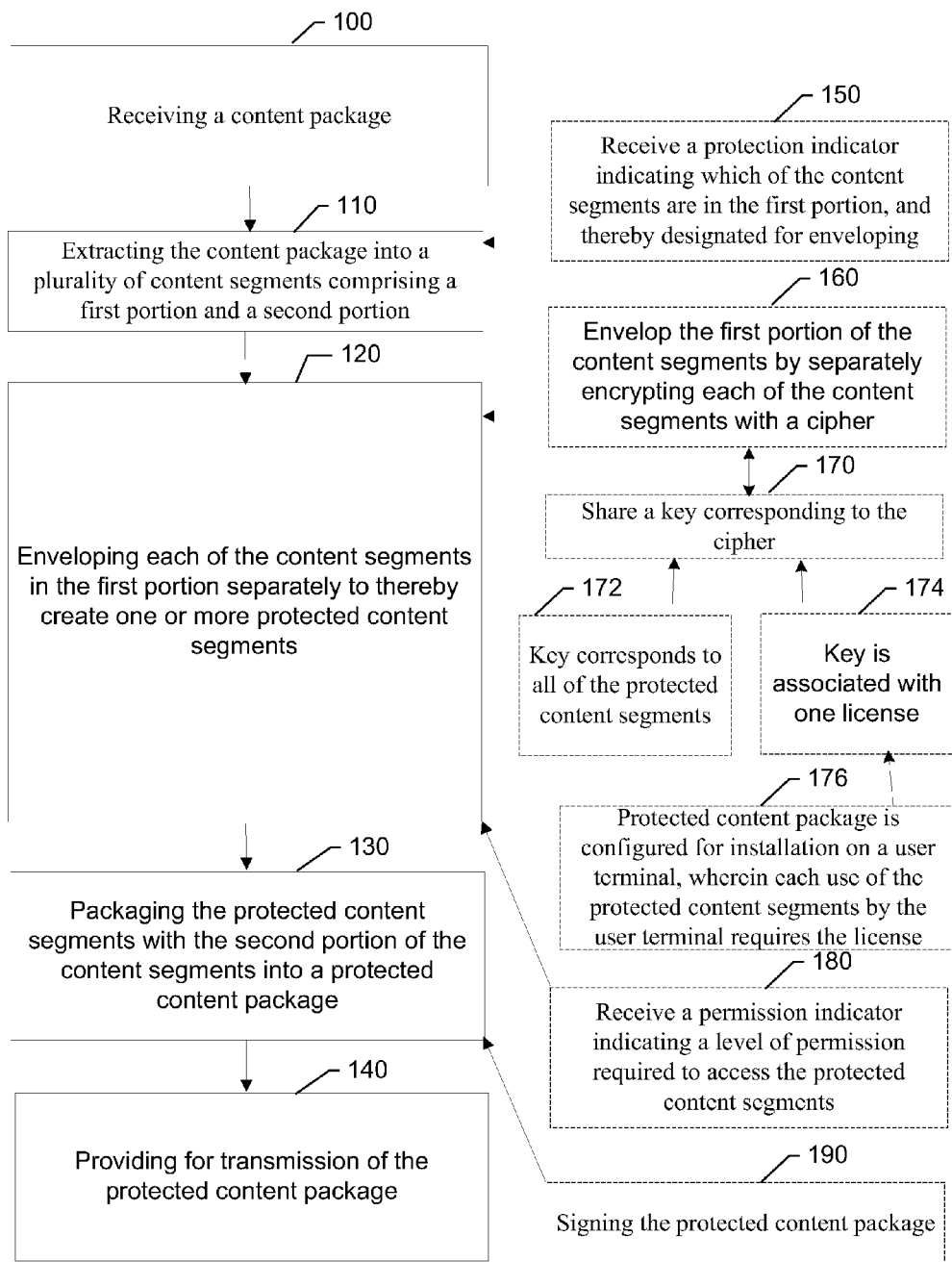
FIG. 3 illustrates a flowchart according to an exemplary method for providing a content protecting and packaging system for protecting a content package according to an exemplary embodiment of the present invention.

In terms of methods associated with embodiments of the present invention, the above described apparatus or other embodiments of apparatuses may be employed. In this regard, FIG. 3 is a flowchart of a system, method and program product according to exemplary embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for providing a content protecting and packaging system for protecting content as provided in FIG. 3 may include receiving a content package at operation 100 and extracting the content package into a plurality of content segments comprising a first portion and a second portion at operation 110. The method may further involve receiving a protection indicator indicating which of the content segments are in the first portion, and thereby designated for enveloping at operation 150. The method further comprises enveloping each of the content segments in the first portion separately to thereby create one or more protected content segments at operation 120. The method may further include enveloping the first portion of the content segments by separately encrypting each of the content segments with a cipher at operation 160. In such embodiments the method may further include sharing a key corresponding to the cipher at operation 170. Further, the key may correspond to all of the protected content segments, as indicated at block 172, and the key may be associated with one license, as indicated at block 174. In some embodiments, the protected content package is configured for installation on a user terminal, wherein each use of the protected content segments by the user terminal requires the license, as indicated at block 176. Also, the method may further comprise receiving a permission indicator indicating a level of permission required to access the protected content segments at operation 180. After enveloping at operation 120, the method further includes packaging the protected content segments with the second portion of the content segments into a protected content package at operation 130. Thereafter, the method may further include signing the protected content package at operation 190 to ensure integrity of the content. Finally, the method includes providing for transmission of the protected content package at operation 140.

In an exemplary embodiment, an apparatus for performing the method of FIG. 3 above may comprise a processor (e.g., the processor 70) configured to perform some or each of the operations (100-180) described above. The processor may, for example, be configured to perform the operations (100-180) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-180 may comprise, for example, the processor 70, the extractor 78, the enveloper 80, the packager 82, and/or an algorithm executed by the processor 70 for processing information as described above.

Figure 4:
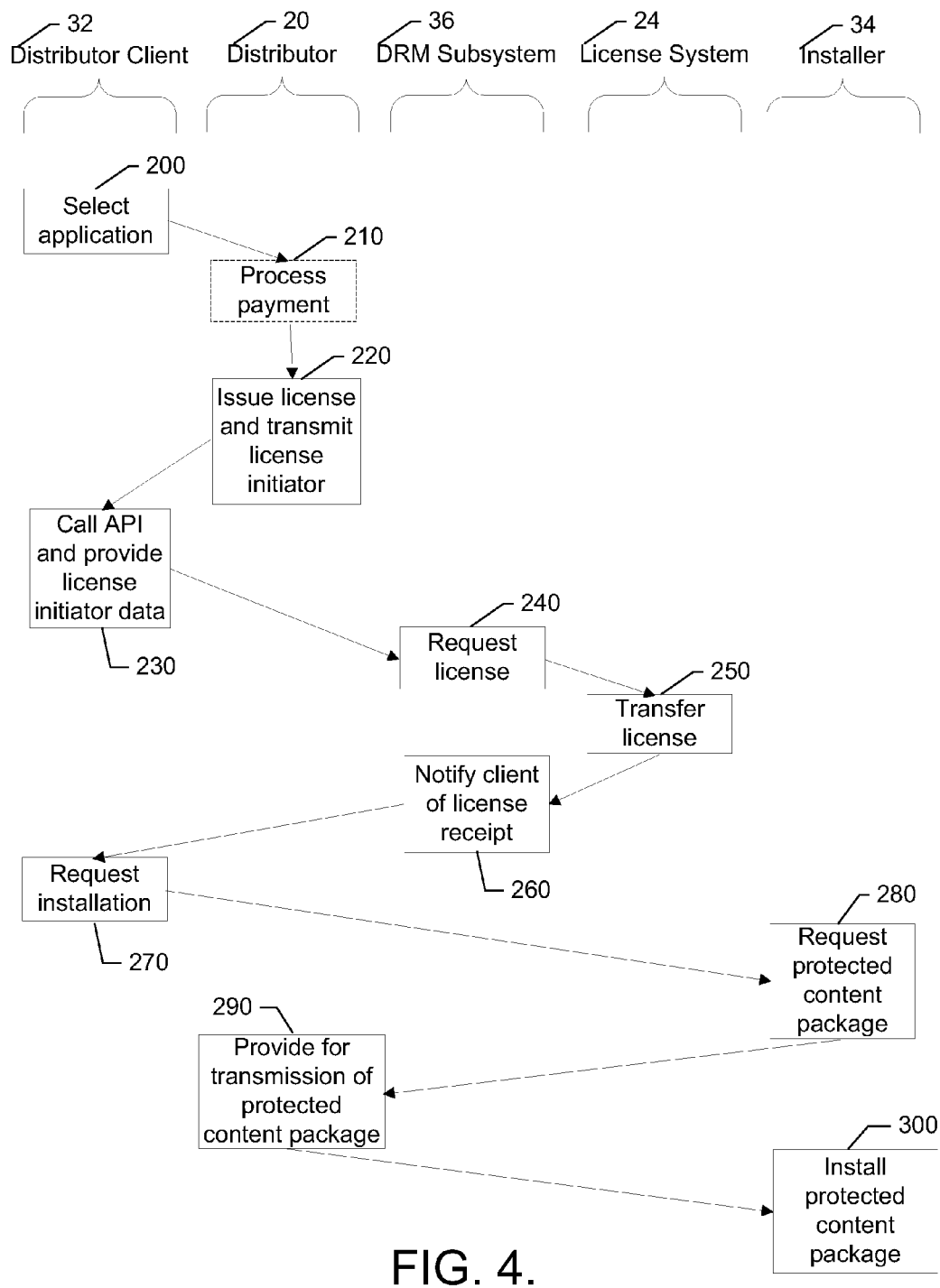
FIG. 4 illustrates a flowchart according to an exemplary method for distributing a protected content package according to an exemplary embodiment of the present invention.

FIG. 4 illustrates a flowchart of a system, method and program product according to additional exemplary embodiments of the invention. In particular, FIG. 4 illustrates a flowchart relating to distributing a protected content package according to an exemplary embodiment of the present invention. The method is generally described as relating to installation of an application on a user terminal 10, but other types of protected content packages may use such a method, and they may be installed on various other types of devices.

The method comprises selecting an application at operation 200, which may be carried out by an end user on a user terminal 10 with a distributor client 32. The method may further comprise processing payment at operation 210, though this will not always be required due to some applications being offered for free. In operation 220 the license is issued and the license initiator is transmitted, which may be conducted by the distributor 20. The distributor client 32 may then call one or more relevant APIs and provide the license initiator data at operation 230. The operation 240 of requesting the license may then be conducted by the DRM subsystem 36 with the license system 24 then transferring the license at operation 250, which may include a relevant key for decryption. After the DRM subsystem 36 notifies the distributor client 32 of the license receipt at operation 260, the distributor client may then request installation at operation 270. Accordingly, the installer 34 may then request the protected content package at operation 280, and the distributor 20 may respond by providing for transmission of the protected content package at operation 290, which in terms of this operation may refer to providing the content to the user terminal 10. Finally, at operation 300 the installer 34 installs the protected package content package on the user terminal. Accordingly, methods of installing a protected content package are herein provided.

Once the protected content package is installed on the user terminal 10, use of the protected content package may require a license for each use of the protected content segments by the user terminal. For example, the protected content segments may remain in a protected form on the user terminal 10 such that the protected content segments may not be distributed to other apparatuses or devices in an unprotected form. Thus, in some embodiments computer-readable instructions or a series of computer-readable instructions will check the access rights and license availability each time a user attempts to use or otherwise access the protected content package. Accordingly, protection of the protected content package may continue even after the protected content package is installed on a user terminal 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising: at least one processor and at least one memory including computer program code, the at least one memory and the computer program code configured to, with the processor, cause the apparatus to: receive, from a content source, a content package comprising a plurality of content segments, wherein the content segments comprise components of a computer program or application; extract the content package into the plurality of content segments, the extracted plurality of content segments comprising a first portion including one or more content segments and a second portion including one or more content segments, wherein the first portion comprises content segments necessary for use of the content and wherein the one or more content segments to be extracted into the first portion are identified by a protection indicator; envelop each of the one or more content segments in the first portion separately to thereby create one or more protected content segments; package the protected content segments with the second portion of the content segments into a protected content package, wherein the second portion of the content segments remains unprotected in the protected content package; return the protected content package to the content source for the content source to sign the protected content package with a content source's signature; and following the content source signing the protected content package, provide for transmission of the protected content package including the content source's signature.

2. The apparatus of claim 1, further configured to separately encrypt each of the content segments defining the first portion with a cipher in order to envelop the first portion of the content segments.

3. The apparatus of claim 2, further configured to share a key corresponding to the cipher.

4. The apparatus of claim 3, wherein the key corresponds to each of the protected content segments.

5. The apparatus of claim 3, wherein the key is associated with one license.

6. The apparatus of claim 1, further configured to receive the protection indicator indicating which of the content segments are in the first portion, and thereby designated to be enveloped.

7. The apparatus of claim 1, further configured to receive a permission indicator indicating a level of permission that provides access to the protected content segments.

8. A method comprising: receiving, from a content source, a content package comprising a plurality of content segments, wherein the content segments comprise components of a computer program or application; extracting the content package into the plurality of content segments, the extracted plurality of content segments comprising a first portion including one or more content segments and a second portion including one or more content segments, wherein the first portion comprises content segments necessary for use of the content and wherein the one or more content segments to be extracted into the first portion are identified by a protection indicator; enveloping each of the one or more content segments in the first portion separately to thereby create one or more protected content segments; packaging, by a processor, the protected content segments with the second portion of the content segments into a protected content package, wherein the second portion of the content segments remains unprotected in the protected content package; returning the protected content package to the content source for the content source to sign the protected content package with a content source's signature; and following the content source signing the protected content package, providing for transmission of the protected content package including the content source's signature.

9. The method of claim 8, wherein enveloping the first portion of the content segments comprises separately encrypting each of the content segments with a cipher.

10. The method of claim 9, further comprising sharing a key corresponding to the cipher.

11. The method of claim 10, wherein the key corresponds to each of the protected content segments.

12. The method of claim 10, wherein the key is associated with one license.

13. The method of claim 8, further comprising receiving the protection indicator indicating which of the content segments are in the first portion, and thereby designated for enveloping.

14. The method of claim 8, further comprising receiving a permission indicator indicating a level of permission that provides access to the protected content segments.

15. A computer program product comprising at least one non-transitory computer-readable storage medium having computer-executable program code portions stored therein, the computer-executable program code portions, when executed, cause an apparatus to: receive, from a content source, a content package comprising a plurality of content segments, wherein the content segments comprise components of a computer program or application; extract the content package into the plurality of content segments, the extracted plurality of content segments comprising, a first portion including, one or more content segments and a second portion including one or more content segments, wherein the first portion comprises content segments necessary for use of the content and wherein the one or more content segments to be extracted into the first portion are identified by as protection indicator; envelope each of the one or more content segments in the first portion separately to thereby create one or more protected content segments; package the protected content segments with the second portion of the content segments into a protected content package, wherein the second portion of the content segments remains unprotected in the protected content package; return the protected content package to the content source for the content source to sign the protected content package with a content source's signature; and following the content source signing the protected content package, provide for transmission of the protected content package including, the content source's signature.

16. The computer program product of claim 15, wherein the program code instructions, when executed, cause the apparatus to envelop the first portion of the content segments by separately encrypting each of the content segments with a cipher.

17. The computer program product of claim 16, wherein the program code instructions, when executed, cause the apparatus to share a key corresponding to the cipher.

18. The computer program product of claim 17, wherein the program code instructions, when executed, cause the apparatus to associate the key with one license.

19. The computer program product of claim 15, wherein the program code instructions, when executed, cause the apparatus to receive the protection indicator indicating which of the content segments are in the first portion, and thereby designated for enveloping.

20. The computer program product of claim 15, wherein the program code instructions, when executed, cause the apparatus to receive a permission indicator indicating a level of permission that provides access to the protected content segments.

* * * * *

UNITED STATES PATENT AND TRADEMARK OFFICE
CERTIFICATE OF CORRECTION

PATENT NO. : 9,760,693 B2  
APPLICATION NO. : 12/981702  
DATED : September 12, 2017  
INVENTOR(S) : Gurel et al.

Page 1 of 1

It is certified that error appears in the above-identified patent and that said Letters Patent is hereby corrected as shown below:

On the Title Page

Column 1,
Item (75), in "Inventors", Line 1, "Iihan" should read --Ilhan--.
Item (75), in "Inventors", Line 4, "Prikkala" should read --Pirkkala--.

In the Claims

Column 14,
Line 5, "comprising," should read --comprising--.
Line 6, "including," should read --including--.
Line 11, "by as" should read --by a--.
Line 11, "envelope" should read --envelop--.
Line 22, "including," should read --including--.

Signed and Sealed this
Nineteenth Day of June, 2018

Andrei Iancu
*Director of the United States Patent and Trademark Office*